United States Patent [19]
Wakino

[11] Patent Number: 5,441,657
[45] Date of Patent: Aug. 15, 1995

[54] VIBRATION-ISOLATING COMPOSITE MATERIAL

[75] Inventor: Kikuo Wakino, Mukou, Japan

[73] Assignee: Murata Mfg. Co., Ltd., Japan

[21] Appl. No.: 327,985

[22] Filed: Oct. 24, 1994

Related U.S. Application Data

[63] Continuation-in-part of Ser. No. 125,424, Sep. 22, 1993, abandoned.

[30] Foreign Application Priority Data

Mar. 24, 1991 [JP] Japan .................................. 4-65990

[51] Int. Cl.⁶ .............................................. E04B 1/74
[52] U.S. Cl. ...................................... 252/62; 310/326; 260/DIG. 46; 523/451; 523/459; 523/460; 523/506; 523/516; 524/403; 524/404; 524/417
[58] Field of Search ................. 252/62, 62.9, 500, 511, 252/512, 521; 310/310, 326, 340, 327; 260/DIG. 46; 428/539.5; 523/506, 516, 451, 459, 460; 524/404, 403, 417

[56] References Cited

U.S. PATENT DOCUMENTS

4,595,515 6/1986 Wakino et al. ......................... 252/62

Primary Examiner—Mark L. Bell
Assistant Examiner—Paul Marcantoni
Attorney, Agent, or Firm—Ostrolenk, Faber, Gerb & Soffen

[57] ABSTRACT

A vibration-isolating composite material consists essentially of powder of an inorganic elastic material and a synthetic polymer mixed thereto. The inorganic elastic material is at least one material selected from the group consisting of $NdP_5O_4$, $BiVO_3$, $Gd_2(MoO_4)_3$, $GdNbO_4$ and $KH_2PO_4$ and the synthetic polymer is at least one material selected from the group consisting of thermoplastic resins, thermosetting resins and rubber materials.

13 Claims, 2 Drawing Sheets

VIBRATION-ISOLATING COMPOSITE MATERIAL

This is a continuation-in-part application of application Ser. No. 08/125,424, filed Sep. 22, 1993, now abandoned.

BACKGROUND OF THE INVENTION

1. Field of the Invention

The present invention relates to a vibration-isolating composite material.

2. Description of the Prior Art

Recently, vibrations have been developed into a great social problem awaiting a solution. Further, in precise processing carried out by use of optical instruments, laser devices or the like, very small vibrations have a great influence on quality of products. In order to minimize disadvantages due to vibrations, there have been proposed various measures against vibrations. For example, it has been proposed to improve the stiffness of devices serving as a source of vibrations. Also, it has been proposed to provide a means for preventing the precise devises from sympathetic vibrations or a means for isolating vibrations.

The most popular vibration isolating means is to use a vibration-isolating material which reduces vibrations applied. As such a vibration-isolating material, there have been used rubbers, damping metals (generally, alloys) and composite ferrite materials. According to the theory of vibration, a vibration-isolating material to be used is required to meet the requirements that it has a large mass, large energy loss ratio of vibration transmission and logarithmic decrement, and large elastic modulus.

The vibration-isolating materials of the prior art satisfy some of the aforesaid requirements, but none of them satisfy all the requirements. For example, the rubbers are large in logarithmic decrement but small in elastic modulus. Contrary to this, the damping metals are very large in elastic modulus but small in logarithmic decrement. Further, the ferrite composite materials are large in both the logarithmic decrement and elastic modulus, but they cannot be accepted as a material for use in very high precise apparatus. This is because the ferrite composite material is magnetized with orientation due to ferromagnetic material contained therein so that vibration-isolating articles made of such ferrite composite material would cause magnetic flux which has a considerable influence on the properties of the precise apparatus.

U.S. Pat. No. 4,595,515 discloses a composite material for vibration-insulating articles comprising a high polymer with a powdered organic or inorganic piezoelectric material dispersed therein, and having electrical leakage paths provided therein. In such a composite material, vibration energy applied thereto is first converted by the piezoelectric effect of the piezoelectric material into electric energy or charges, and the produced electric charges are converted into thermal energy while flowing through the electrical leakage paths and consumed as heat.

However, the above composite material can not applied to vibration-insulating articles used for the very high precise instruments sensitive to electric charges since the composite material generates electric charges by vibration.

SUMMARY OF THE INVENTION

It is therefore an object of the present invention to provide an improved vibration-isolating material which overcomes the aforesaid disadvantages.

Another object of the present invention is to provide a vibration-isolating material having a large mass, a logarithmic decrement and a large elastic modulus.

These and other objects of the present invention is achieved by dispersing powder of an inorganic elastic material in a synthetic polymer.

According to the present invention, there is provided a vibration-isolating material consisting essentially of a synthetic polymer and powder of an inorganic elastic material dispersed therein, said elastic material being at least one inorganic elastic material selected from the group consisting of $NdP_5O_4$, $BiVO_3$, $Gd_2(MoO_4)_3$, $GdNbO_4$, $KH_2PO_4$ and the like.

As the synthetic polymer, there may be used those such as thermoplastic resins, thermosetting resins and rubber materials.

As the thermoplastic resins, there may be used those such as, for example, polyethylene, polypropylene, vinyl chloride resin, polystyrene, acrylic resin, polyamide resin, polycarbonate, polyacetal resin, polyphenylene oxide, saturated polyester resin, cellulose acetate, polyvinyl acetate, fluorocarbon polymer, vinylidene fluoride, vinylidene chloride, ionomer, poly(4-methylpentene-1), polyphenylene sulfide, and polyacrylate.

As the thermosetting resins, there may be used those such as, for example, polyimide, polyamide-imide resin, polyurethane, silicone resin, allyl resin, epoxy resin, unsaturated polyester resin, amino resin, and phenol resin.

The rubber materials include, without being limited to, fluoro-rubber, silicone rubber, butyl rubber, butadiene rubber, ethylene-vinyl acetate copolymer, thermoplastic elastomer and the like. Typical thermoplastic elastomer are thermoplastic polyurethane, styrene-butadinene block copolymer, thermoplastic polyether elastomer, thermoplastic polyolefine elastomer, thermoplastic polybutadiene elastomer, and the like.

The above thermoplastic resins, thermosetting resins and rubber materials may be used alone or in combination.

Preferably, the vibration-isolating composite material of the present invention is composed of 40 to 95 percent by weight of powder of the elastic material and 5 to 60 percent by weight of a synthetic polymer. The greater the content of the powder of the elastic material, the greater the specific gravity and logarithmic decrement. On the other hand, the greater the content of the synthetic polymer the greater is the elastic modulus and mechanical strength. However, if the content of the elastic material exceeds 95% or if the content of the synthetic polymer is less than 5%, it is difficult to disperse the elastic material in the synthetic resin as well as to mold the composite material in the desired shape. If the content of the synthetic polymer exceeds 60% or if the content of the elastic material is less than 40%, attenuation effects become considerably lowered.

The vibration-isolating composite material may be used in any form such as a plate, a disk, a box, a cylinder, a tube, or the like. The vibration-isolators made of the vibration-isolating composite material of the present invention have a large mechanical loss because of the presence of the inorganic elastic material, so that strains and mechanical stress produced in the vibration-isolator by vibration energies are converted into thermal energies and finally consumed as heat. Further, since the vibration-isolating composite material of the present invention is composed of powder of the inorganic elastic material such as $NdP_5O_4$, $BiVO_3$, $Gd_2(MoO_4)_3$, $GdNbO_4$, $KH_2PO_4$ dispersed in a matrix of polyester resin, it has a large mass and elastic coefficient, thus making it possible to produce vibration-isolators with superior vibration-isolating properties.

These and other objects and features of the present invention will become clear from the following description taken in conjunction with the preferred embodiments thereof.

EXAMPLE 1

Using $BiVO_3$ powder as a inorganic elastic material, and an unsaturated polyester resin as a synthetic polymer, there were prepared vibration-isolating plates in the following manner. The $BiVO_3$ powder and unsaturated polyester resin were mixed in the weight ratio of 85:15, and added with 1% by weight of a polymerizing agent (dibenzoyl peroxide). After degassing sufficiently, the mixture was molded into square plates of 10 cm × 10 cm × 0.5 cm. The plates were heated to 100° C. and maintained at that temperature for 2 hours to complete polymerization of the polyester.

Figure 1:
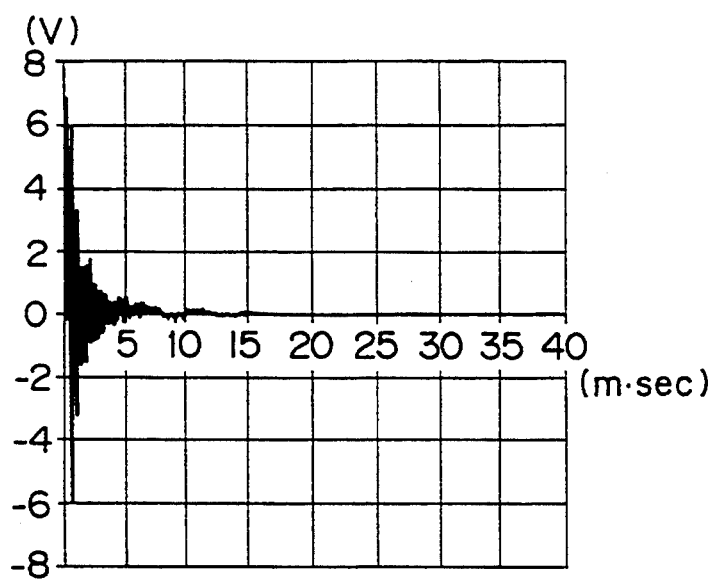
FIG. 1 is an explanatory drawing showing vibration-damping characteristics for a vibration-isolator composed of a vibration-isolating composite material according to the present invention.

Using the resultant composite vibration-isolators as specimens, measurement was made on change of the acceleration of vibration to determine its vibration-isolating property. The change of the acceleration of vibration was determined at the corner to the specimen when an impact was applied to the center of the specimen by a steel ball of 2 g falling from a level 20 cm high. The result is shown in FIG. 1.

On the other hand, measurements were made on physical properties of the composite vibration-isolator. The results were as follows:
 Specific gravity: 4.08
 Elastic modulus: 1200 Kgf/mm$^2$
 Logarithmic decrement: 0.2.

COMPARATIVE EXAMPLE

Figure 2:
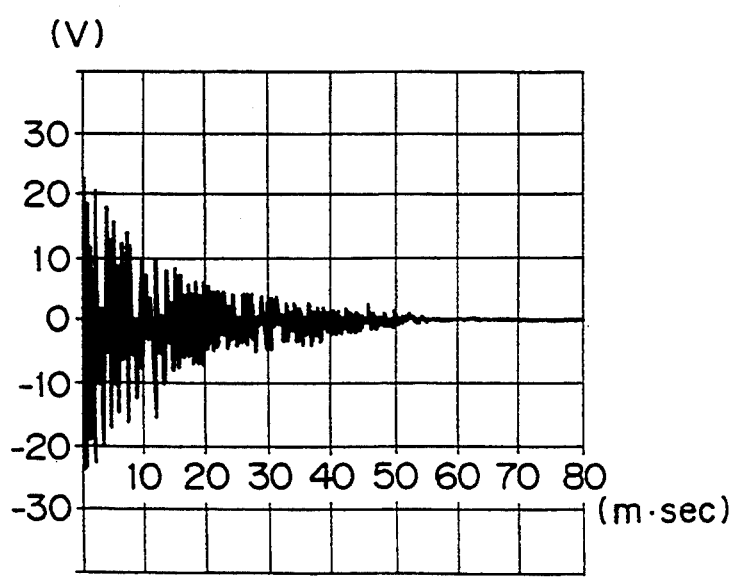
FIG. 2 is an explanatory drawing showing vibration-damping characteristics for a vibration-isolator of the prior art.

Using a cast iron, there were prepared vibration-isolators having the same dimensions as that in Example 1. A change of the acceleration of vibration was determined in the same manner as in Example 1. The result is shown in FIG. 2. The physical properties of the vibration-isolators were as follows:
 Specific gravity: 7.1
 Elastic modulus: 13000 Kgf/mm$^2$
 Logarithmic decrement of 0.0007

As can be seen from comparison of the results shown in FIGS. 1 and 2, the vibration-isolator of the present invention provides a sharp underdamping of vibration as compared with the comparative example. Further, the logarithmic decrement of the vibration-isolator of the present invention is 0.2 which is about 280 times larger than that of the vibration-isolator of the prior art, i.e., 0.0007. This results from the fact that the vibration-isolator of the present invention comprises a composite material composed of $BiVO_3$ powder dispersed in a matrix of polyester resin so that it has a large mechanical loss. For that reason, strains and mechanical stress produced by the vibration energies applied thereto are converted into thermal energies and consumed as heat.

EXAMPLE 2

Figure 3:
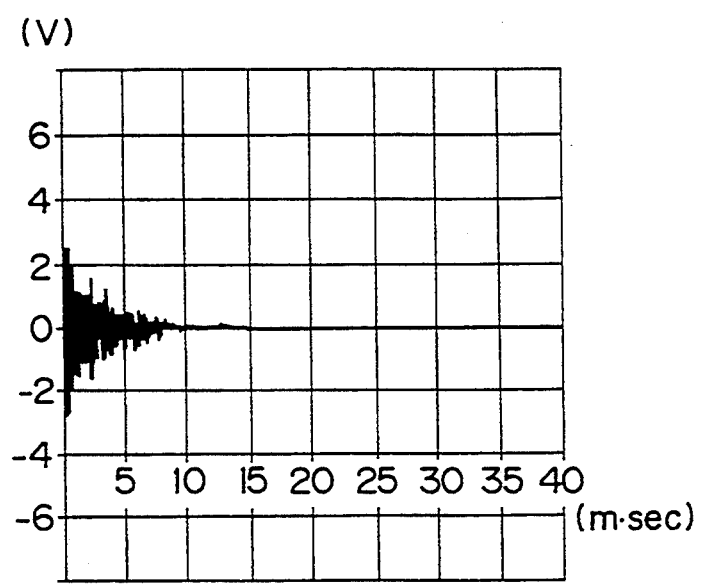
FIG. 3 is an explanatory drawing showing vibration-damping characteristics for another embodiment of a vibration-isolator composed of a vibration-isolating composite material according to the present invention.

Using $NdP_5O_4$ powder and polyester resin as raw materials, there were prepared vibration-isolators in the same manner as disclosed in Example 1 so that the resultant composite material has a composition composed of 85% by weight of $NdP_5O_4$ powder and 15% by weight of polyester resin. The vibration-isolating property of the resultant vibration-isolators was determined in the same manner as that in Example 1. The result is shown in FIG. 3. The physical properties of the vibration-isolator plate were as follows:
 Logarithmic decrement: 0.3
 Specific gravity: 4.3
 Elastic modulus: 1010 Kgf/mm$^2$ From the results, it will be seen that the vibration-isolators according to the present invention is much superior in the logarithmic decrement to vibration-isolators of cast iron.

EXAMPLE 3

Using powder of $Gd_2(MoO_4)O_3$ and polybutylene terephthalate (PBT), there were prepared vibration-isolators composed of 85% by weight of $Gd_2(MoO_4)O_3$ and 15% by weight of PBT in the same manner as Example 1. The resultant vibration-isolators have a vibration-isolating property similar to that shown in FIG. 1. The physical properties of the produced vibration-isolator plate were as follows:
 Logarithmic decrement: 0.30
 Specific gravity: 4.4
 Elastic modulus: 1100 Kgf/mm$^2$

EXAMPLE 4

Using powder of $GdNbO_4$ and PBT, there were prepared vibration-isolators composed of 85% by weight of $GdNbO_4$ and 15% by weight of PBT in the same manner as Example 1. The resultant vibration-isolators have the vibration-isolating property similar to that shown in FIG. 1. The physical properties of the vibration-isolator were as follows:
 Logarithmic decrement: 0.33
 Specific gravity: 4.4
 Elastic modulus: 1050 Kgf/mm$^2$

EXAMPLE 5

Using powders of $GdNbO_4$ and $KH_2PO_4$, and PBT, there were prepared vibration-isolators composed of 70% by weight of $GdNbO_4$, 15% by weight of $KH_2PO_4$, and 15% by weight of PBT in the same manner as Example 1. The resultant vibration-isolators have the vibration-isolating property similar to that shown in FIG. 1. The physical properties of the produced vibration-isolator were as follows:
 Logarithmic decrement: 0.25
 Specific gravity: 4.0
 Elastic modulus: 1100 Kgf/mm$^2$ Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A vibration-isolating composite material consisting essentially of, by weight, 40 to 95% of powder of an inorganic elastic material and 5 to 60% of a synthetic polymer mixed thereto, said inorganic elastic material being at least one inorganic elastic material selected from the group consisting of $NdP_5O_4$, $BiVO_3$, $Gd_2(MoO_4)_3$, $GdNbO_4$ and $KH_2PO_4$.

2. The vibration-isolating composite material according to claim 1, wherein said synthetic polymer is at least one material selected from the group consisting of thermoplastic resins, thermosetting resins, and rubber materials.

3. The vibration-isolating composite material according to claim 2, wherein said synthetic polymer is at least one thermoplastic resin selected from the group consisting of polyethylene, polypropylene, vinyl chloride resin, polystyrene, acrylic resin, polyamide resin, polycarbonate, polyacetal resin, polyphenylene oxide, saturated polyester resin, cellulose acetate, polyvinyl acetate, fluorocarbon polymer, vinylidene fluoride, vinylidene chloride, ionomer, poly(4-methylpentene-1), polyphenylene sulfide, and polyacrylate.

4. The vibration-isolating composite material according to claim 2, wherein said synthetic polymer is at least one thermosetting resin selected from the group consisting of polyimide, polyamide-imide resin, polyurethane, silicone resin, allyl resin, epoxy resin, unsaturated polyester resin, amino resin, and phenol resin.

5. The vibration-isolating composite material according to claim 2, wherein said synthetic polymer is at least one rubber material selected from the group consisting of fluoro-rubber, silicone rubber, butyl rubber, butadiene rubber, ethylene-vinyl acetate copolymer, and thermoplastic elastomer.

6. The vibration-isolating composite material according to claim 5, wherein said thermoplastic elastomer is a thermoplastic polyurethane, styrene-butadinene block copolymer, thermoplastic polyether elastomer, thermoplastic polyolefin elastomer, or thermoplastic polybutadiene elastomer.

7. The vibration-isolating composite material according to claim 2, wherein said synthetic polymer is an unsaturated polyester thermosetting resin and the inorganic elastic material is $BiVO_3$.

8. A vibration-isolating composite material according to claim 1, wherein the inorganic elastic material is $NdP_5O_4$.

9. A vibration-isolating composite material according to claim 1, wherein the inorganic elastic material is $BiVO_3$.

10. A vibration-isolating composite material according to claim 1, wherein the inorganic elastic material is $Gd_2(MoO_4)_3$.

11. A vibration-isolating composite material according to claim 1, wherein the inorganic elastic material is $GdNbO_4$.

12. A vibration-isolating composite material according to claim 1, wherein the inorganic elastic material is $KH_2PO_4$.

13. A vibration-isolating composite material according to claim 1, wherein the inorganic elastic material is a combination of $GdNbO_4$ and $KH_2PO_4$.

* * * * *